United States Patent [15] 3,656,762
Johnson [45] Apr. 18, 1972

[54] PHONOGRAPH PICKUP HEAD ASSEMBLY

[72] Inventor: Richard D. Johnson, Rosemead, Calif.
[73] Assignee: Reverbasonics, Inc., Oakland, Calif.
[22] Filed: Jan. 7, 1970
[21] Appl. No.: 1,232

[52] U.S. Cl. ....274/37, 274/24
[51] Int. Cl. ....G11b 3/02
[58] Field of Search ....274/37, 24–26, 274/31, 23; 179/100.1 TD, 100.4 ST, 100.41 S, 100.41 ST

[56] References Cited

UNITED STATES PATENTS

| | | | |
|---|---|---|---|
| 1,208,561 | 12/1916 | Huff | 274/24.5 |
| 2,821,578 | 1/1958 | Morrell, Jr. | 179/100.41 |
| 3,236,526 | 2/1966 | Capparelli, Jr. | 274/23 |
| 3,120,393 | 2/1964 | Pennucci | 274/23 R |

*Primary Examiner*—Leonard Forman
*Assistant Examiner*—Charles E. Phillips
*Attorney*—Anderson, Luedeka, Fitch, Even and Tabin

[57] ABSTRACT

A phonograph pickup head assembly is described for producing reverberative sound signals from a grooved phonograph disc. The head assembly includes a pickup head and forward and rear cartridge supports. The rear cartridge support is secured rigidly to the pickup head and the forward cartridge support is secured such that it is movable laterally and vertically with respect thereto. A mounting clamp is provided at the rearward end of the pickup head for attaching the pickup head to a tone arm in a manner in which the relative angular position of the pickup head with respect to the tone arm is adjustable.

3 Claims, 4 Drawing Figures

INVENTOR.
RICHARD D. JOHNSON
BY Anderson, Luedeka, Fitch, Even & Tabin
ATTORNEYS

PHONOGRAPH PICKUP HEAD ASSEMBLY

This invention relates to phonograph pickup head assemblies and, more particularly, to an improved phonograph pickup head assembly for producing reverberative sound signals from a grooved phonograph disc.

Reverberative sound, that is, sound in which an echo or attenuated signal is received by the ear a fraction of a second after the original signal, may be employed to enhance the quality of sound reproduction under some circumstances. For example, a slight amount of reverberation or echo can effect a subjective enlargement of the particular enclosure in which the listener is located, creating an effect more closely approximating a large concert hall rather than the small and acoustically dead room in which the listener may be located. Moreover, the ability to introduce reverberation into the reproduction of a phonograph recording may be an attractive novelty for many owners of phonograph reproduction equipment.

Various means have been devised for producing reverberative sound. Such means include sonic, mechanical, and electrical delay lines through which part of the signal is diverted to produce a second signal delayed in time. Typically, however, such means are expensive, relatively large in size, introduce distortion and are difficult to adapt into existing systems for modifying such systems.

Accordingly, it is an object of the present invention to provide an improved means for producing reverberative sound.

Another object of the invention is to provide a means, for producing reverberative sound signals, which is readily adapted into existing systems.

A further object of the invention is to provide an inexpensive compact means for producing reverberative sound signals.

It is another object of the invention to provide a means, for producing reverberative sound signals of low distortion, which is low in cost and which is capable of modifying existing phonograph systems.

Other objects of the invention will become apparent to those skilled in the art from the following description, taken in connection with the accompanying drawings wherein.

Figure 1:
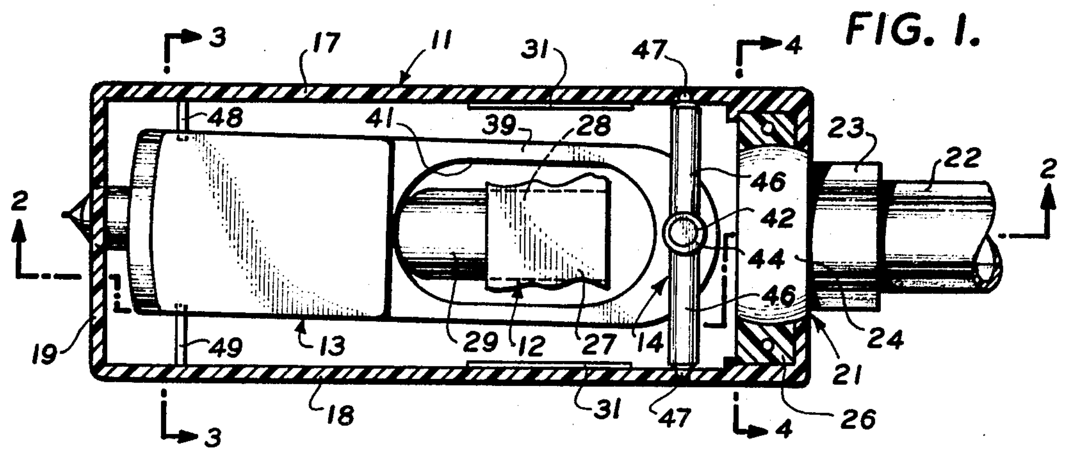
FIG. 1 is a top view, partially in section, of a phonograph pickup head assembly for producing reverberative sound signals from a grooved phonograph disc.

Very generally, the phonograph pickup head assembly of the invention comprises an elongated pickup head 11 having forward and rearward ends. A rear cartridge support 12 is rigidly secured to the pickup head. A forward cartridge support 13 extends adjacent the rear cartridge support and extends forwardly and rearwardly thereof. A universal mount 14 secures the forward cartridge support, at the end thereof rearwardly of the rear cartridge support, to the pickup head.

Referring now more particularly to the drawings, the pickup head assembly of the invention is designed to attach to the tone arm of an existing phonograph where the tone arm is of the type having a removable pickup head. As will be explained more fully below, the pickup head assembly of the invention includes means for supporting a pair of pickup cartridges, one of such cartridges being disposed forwardly of the other. The cartridges ride in the same groove in the phonograph disc and thereby pick up the signals a fraction of a second apart. The second signal, which may be attenuated to any desired degree by suitable electrical circuitry, not illustrated, provides the echo or reverberated signal in the output of the phonograph. The use of dual pickup cartridges in the manner described enables the incorporation of the reverberative mechanism in the pickup head itself. This enables ready modification of existing systems, minimizes distortion since delay lines and associated transducers are unnecessary, and may be manufactured at a relatively lower cost than many devices employing heretofore known techniques for reverberation.

The pickup head 11 is of elongated configuration and includes a top wall 16, a pair of side walls 17 and 18, and a sloping front wall or forward wall 19. The pickup head may be comprised of any suitable material, such as a molded plastic.

A mounting clamp 21 is provided at the rearward end of the pickup head 11 for securing the pickup head on the end of a tone arm 22. The tone arm is of a type having a removable pickup head assembly in order that the original pickup head assembly thereon may be removed and replaced with the pickup head assembly of the invention. In order to attach the pickup head assembly of the invention to the tone arm, the tone arm fits within a ring clamp 23 which forms part of the mounting clamp 21. The ring clamp 23 is hollow and is attached to the tone arm in any suitable manner, such as by a screw-type attachment or set screw, or by a force fit. The ring clamp 23 is attached to a ball 24 and is preferably made integral therewith. The ball 24 is incomplete in the sense that it is not a complete sphere. Nevertheless, less, the ball 24 has a sufficient amount of spherical surface as to cooperate in securing the ball within a socket 26. The ball 24 is hollow to enable electrical leads between the tone arm and the pickup cartridges to pass therethrough.

Figures 2, 3, 4:
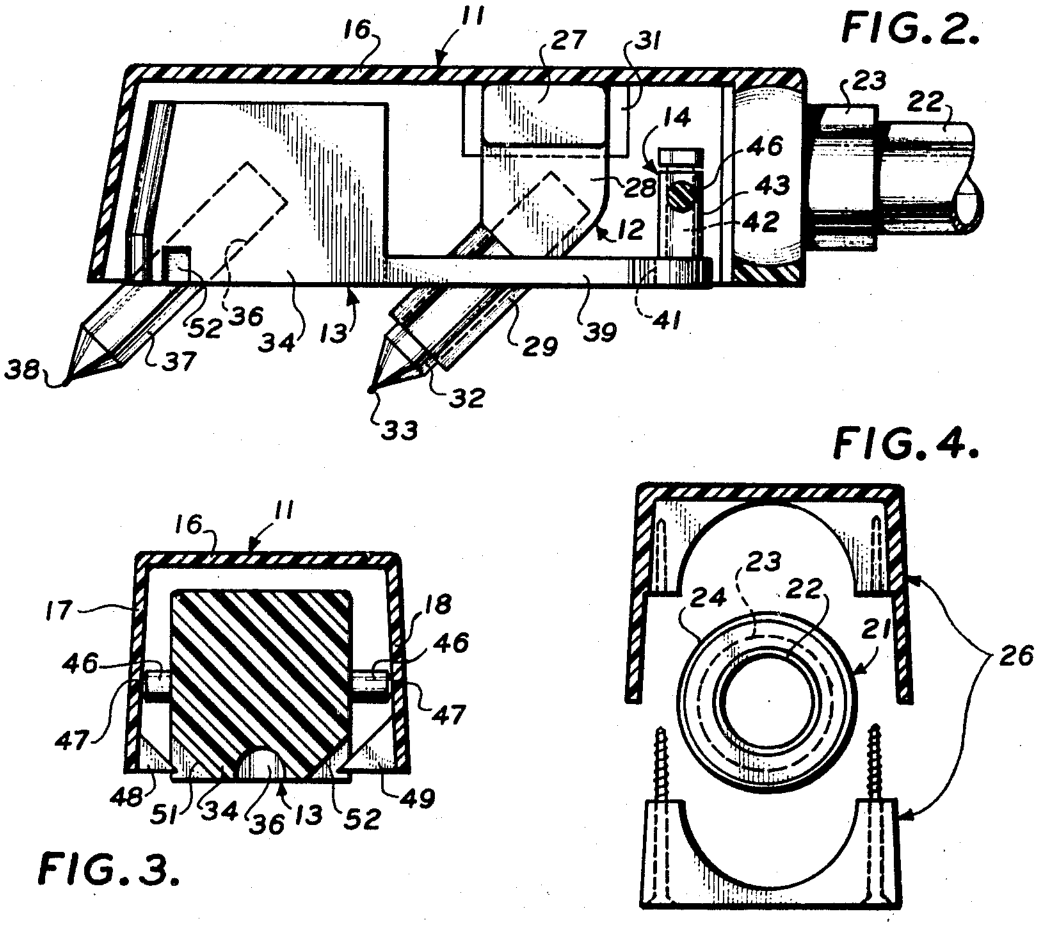
FIG. 2 is a full section view taken along the line 2—2 of FIG. 1.
FIG. 3 is a sectional view taken along the line 3—3 of FIG. 1 and with a pickup cartridge removed for clarity.
FIG. 4 is a sectional view taken along the line 4—4 of FIG. 1, with part in exploded relation.

As may be seen in FIG. 4, the ball socket 26 is formed in the rearward end of the pickup head 11 and is made separable in order that the ball may be assembled therein and in order that the separable portions of the ball socket may be secured against the ball to provide a desired degree of friction therebetween as described below.

The rear cartridge support 12 includes a holder section 27 of generally rectangular cross section, a base section 28 extending outwardly of the middle of the holder section 27, and a tubular socket section 29 extending at an angle from the base section 28. The holder section 27 is snapped into place within the pickup head 11 between a pair of snaps 31 molded integrally in the interior side of the sidewalls 17 and 18. The holder section 27 of the rear cartridge support 12 extends between the snaps 31 and mounts the rear cartridge support rigidly to the pickup head. The rear cartridge support is mounted in the pickup head such that the socket section 29 extends angularly in a direction toward the forward end or wall 19 of the pickup head 11. The rear cartridge 32, with a downwardly extending stylus 33, is mounted within the socket section 29 of the rear cartridge support 12.

The forward cartridge support 13 includes a socket section 34 having a recess 36 therein for receiving the forward cartridge 37 and supporting same. The forward cartridge 37 has a stylus 38 projecting therefrom. The forward cartridge support 13 also includes an arm 39 extending rearwardly of the socket section 34 and terminating at a point rearwardly of the rear cartridge support 12. In order to accommodate the rear cartridge support 12, the arm 39 is provided with an opening 41 therein through which the socket section 29 and the rear cartridge 32 may project.

In order to secure the forward cartridge support 13 to the pickup head 11, the universal mount 14 is provided at the end of the arm 39 rearwardly of the rear cartridge support 12. The universal mount includes a vertical post 42 extending upward from the arm 39. A bearing 43 is provided rotatably supported on the vertical post 42. The bearing 43 is held down in place on the post 42 by means of a disc 44 which is force fit on the upper end of the post 42. The bearing 43 is thereby free to pivot on the vertical post 42. Extending from opposite sides of the bearing 43 in the radial direction are a pair of arms 46, preferably molded integrally with the bearing. At the outward end of each of the arms 46, a pin 47 is provided which extends into suitably located openings in the sidewalls 17 and 18 to support the arms 46 for pivotal movement therein about a horizontal axis. Thus, movement of the forward cartridge support 13 on the axis through the arms 46 permits vertical movement of the forward socket section 34 and the forward cartridge 37 contained therein. Pivotal movement of the forward cartridge support 13 about the vertical axis of the vertical post 42 permits lateral movement of the socket section 34 and the forward cartridge 37 therein with respect to the pickup head 11.

Two triangular projections 48 and 49 extend inwardly from the sidewalls 17 and 18, respectively, near the forward end of the pickup head 11. Slanted recessed surfaces 51 and 52 are provided in the socket section 34 of the forward cartridge support 13 for engaging the correspondingly slanted surfaces on the triangular projections 48 and 49. When the forward cartridge support 13 is pivoted so that the forward cartridge moves upwardly with respect to the pickup head 11, the forward cartridge support clears the triangular projections 48 and 49 and is thereby free to move laterally with respect to the pickup head 11. However, when the forward cartridge support 13 is permitted to fall against the stops or triangular projections 48 and 49, the triangular projections not only prevent further downward vertical movement of the forward cartridge support, but also restrict or limit lateral movement of the forward cartridge support. The positioning of the slanted surfaces 51 and 52, and the size of the triangular projections or stops 48 and 49, are selected to locate the forward cartridge support 13 at a predetermined position laterally with respect to the pickup head when the forward cartridge support is resting against the triangular projections or stops 48 and 49.

When the pickup head assembly of the invention is to be mounted on a tone arm, the original pickup head on the tone arm is first removed. The ring clamp 23 is then slipped over the tone arm and secured thereto and electrical connection is made between the pickup cartridges 32 and 37 and the appropriate wires in the tone arm. In order to ensure that the stylii 33 and 38 will drop into the same groove on a grooved phonograph disc during either manual or automatic operation of the tone arm, the angular relationship between the elongated pickup head 11 and the tone arm 22 in the horizontal plane is adjusted. The ball 24 and ball socket 26 permit such adjustment. Separable portions of the ball socket are tightened such that the desired degree of friction exists between the ball and the socket as to hold the angular relationship between the pickup head and the arm secure but to permit variation of such position by manual manipulation when necessary. The proper relationship is arrived at by trial and error and typically depends upon the size of the phonograph disc. For example, proper adjustment of the angular relationship between the pickup head and the tone arm for one 10-inch record will normally enable playing of all 10-inch records thereafter without further adjustment. If 12 -inch records are then to be played, however, a manual adjustment may be necessary. Thereafter all 12-inch records can normally be played without further adjustment.

A similar trial and error adjustment is made with respect to the angle between the pickup head and the tone arm in the vertical plane. The angle in the vertical plane is adjusted so that the front stylus will rise off the projections or stops 48 and 49 for any number of records in a stack, thus enabling automatic playing. This is done by adjusting the angle so that the forward stylus 38 strikes the record first, preferably about one-sixteenth to one-eighth inch lower than the rear stylus 33. By doing this, the front stylus is enabled to move laterally with respect to the pickup head to allow for the changing angular relationship between the stylii as the tone arm moves across the record from the outside to the inside. The projections or stops 48 and 49 are selected to be of a size so that the front or forward stylus starts from a position to the right of the center of the pickup head. This provides more room for movement or change in the angular relationship, which movement is from right to left looking toward the forward end of the pickup head. By starting to the right of center, less clearance space is required and the pickup head is more centrally balanced since the average position of the forward stylus is at the center.

Because of the location of the lateral pivot point and vertical pivot point, namely, the universal mount 14, the forces tending to displace the forward stylus from the desired groove are reduced. Moreover, by providing the opening in the arm 41 and arm 39 and by providing sufficient clearance between the arm 39 and the rear cartridge holder, a long pivot arm for the forward cartridge is provided without the necessity of having to provide an excessively long pickup head. For example, an approximately 1-inch separation between the stylii may be provided in a total pickup head length of about 2 ½ inches and with a pivot length for the forward cartridge support of almost 2 inches. As a result of this, highly reliable operation is achieved since it is assured that both stylii will remain in the same groove once located therein. Moreover, the fact that the angular relationship between the pickup head and the tone arm is readily adjusted permits adaptation of the invention to automatic systems. Moreover, the invention is readily installed on existing systems which have a tone arm with a removable pickup head. The device of the invention is fully adaptable to automatic operation for a variety of record sizes and stack heights.

It may therefore be seen that the invention provides an improved means for producing reverberative sound. In particular, the invention provides a phonograph pickup head assembly capable of producing reverberative sound signals from a grooved phonograph disc. The apparatus of the invention is readily produced, is low in cost, compact, and readily adapts to existing phonograph systems.

Various modifications of the invention in addition to those shown and described herein will become apparent to those skilled in the art from the foregoing description and accompanying drawings. Such modifications are intended to fall within the scope of the appendant claims.

What is claimed is:

1. A phonograph pickup head assembly for producing reverberative sound signals from a grooved phonograph disc, comprising, an elongated pickup head, a pair of cartridge supports mounted in said elongated pickup head, one of said supports being mounted in fixed relation to said pickup head and the other of said supports being mounted in laterally and vertically movable relation to said pickup head, and a mounting clamp at the rearward end of said pickup head for attaching said pickup head to a tone arm, said mounting clamp having provision for adjusting the angular relation of said pickup head to the one arm, wherein said movable cartridge support comprises an arm having an opening therein for accommodating said fixed cartridge support, said opening being of sufficient size to provide clearance between said arm and said fixed cartridge support so as to allow movement of said arm, and a universal mount securing said movable cartridge support at one end thereof to said pickup head.

2. A phonograph pickup head assembly according to claim 1 including stop means for limiting downward movement of said movable support at a predetermined vertical position relative to said pickup head, said stop means being of a configuration to locate said movable support at a predetermined position laterally with respect to said pickup head with said movable support in the predetermined vertical position.

3. A phonograph pickup head assembly for producing reverberative sound signals from a grooved phonograph disc, comprising, an elongated pickup head, a pair of cartridge supports mounted in said elongated pickup head, one of said supports being mounted in fixed relation to said pickup head and the other of said supports being mounted in laterally and vertically movable relation to said pickup head, and a mounting clamp at the rearward end of said pickup head for attaching said pickup head to a tone arm, said mounting clamp having provision for adjusting the angular relation of said pickup head to the tone arm, wherein said mounting clamp includes a ring clamp for securing said pickup head to the tone arm, a ball socket secured to said pickup head, and a ball disposed in said ball socket and secured to said ring clamp, said ball socket and said ball having a fit which provides sufficient friction to maintain a fixed relative angular relation between said elongated pickup head and the tone arm during automatic operation, but which friction is insufficient to prevent manual adjustment of such angular position.

* * * * *